(12) United States Patent
Suzuki

(10) Patent No.: US 12,404,016 B2
(45) Date of Patent: Sep. 2, 2025

(54) AIRCRAFT AND POWER DEVICE

(71) Applicant: AERONEXT INC., Shibuya-ku (JP)

(72) Inventor: Yoichi Suzuki, Shibuya-ku (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/004,439

(22) PCT Filed: Jul. 7, 2020

(86) PCT No.: PCT/JP2020/026607
§ 371 (c)(1),
(2) Date: Jan. 5, 2023

(87) PCT Pub. No.: WO2022/009319
PCT Pub. Date: Jan. 13, 2022

(65) Prior Publication Data
US 2024/0025574 A1    Jan. 25, 2024

(51) Int. Cl.
*B64U 30/299* (2023.01)
*B64U 10/16* (2023.01)
*B64U 20/94* (2023.01)
*B64U 50/19* (2023.01)
*H02K 7/00* (2006.01)
*H02K 9/22* (2006.01)

(52) U.S. Cl.
CPC ............ *B64U 20/94* (2023.01); *B64U 10/16* (2023.01); *B64U 30/299* (2023.01); *B64U 50/19* (2023.01); *H02K 7/006* (2013.01); *H02K 9/227* (2021.01)

(58) Field of Classification Search
CPC ........ B64U 50/19; B64U 60/50; B64U 60/70; B64D 45/04; B64D 45/06
See application file for complete search history.

(56) References Cited

U.S. PATENT DOCUMENTS

2017/0144753 A1    5/2017  Yu
2017/0283050 A1*  10/2017  Baek .................. B64C 27/50
2017/0349264 A1   12/2017  Nilson
(Continued)

FOREIGN PATENT DOCUMENTS

CN    205952311 U    2/2017
CN    107264784 A    10/2017
CN    209581892 U    11/2019
(Continued)

OTHER PUBLICATIONS

Notice of Reasons for Refusal dated Jan. 4, 2024 for Japanese Patent Application No. 2021-020021.
(Continued)

*Primary Examiner* — Ashesh Dangol
(74) *Attorney, Agent, or Firm* — HAUPTMAN HAM, LLP

(57) ABSTRACT

To provide an aircraft having improved efficiency and flexibility of the airframe configuration when installing a functional part in the airframe, and a power unit having a configuration for the improved efficiency and flexibility. To provide an aircraft, comprising: a power unit having a first space open at least one of its upper or lower surface; a propeller having a first through-space and connected to the power unit; and a functional part having a predetermined function and located at least partially in an internal space formed by the first space and the first through-space.

16 Claims, 16 Drawing Sheets

(56) References Cited

U.S. PATENT DOCUMENTS

2020/0140062 A1\* 5/2020 Bar Yohai .............. B64U 30/26

FOREIGN PATENT DOCUMENTS

| | | |
|---|---|---|
| CN | 211417619 U | 9/2020 |
| JP | 2015110413 A | 6/2015 |
| JP | 2018052227 A | 4/2018 |
| JP | 2020059315 A | 4/2019 |
| JP | 2019172059 A | 10/2019 |
| KR | 20180007093 A | 1/2018 |
| WO | 2006048205 A1 | 5/2006 |
| WO | 2016179827 A1 | 11/2016 |
| WO | 2018139661 A1 | 8/2018 |

OTHER PUBLICATIONS

International Search report dated Sep. 15, 2020 for International Application No. PCT/JP2020/026607.
Office Action in CN application No. 202110193715.3, dated Dec. 19, 2024, 14pp.

\* cited by examiner

AIRCRAFT AND POWER DEVICE

TECHNICAL FIELD

This invention relates to an aircraft and power device.

BACKGROUND ART

In recent years, the use of drones and unmanned aerial vehicles (UAVs) and other flying vehicles (hereinafter collectively referred to as "aircraft") has been increasing. In line with this trend, efforts are underway to improve the performance of aircrafts and to develop new services that use these aircrafts. In practice, various parts may be attached to its airframe to add predetermined functions to the aircraft, and Patent Literature 1 discloses an aircraft equipped with landing legs that are capable of cushioning the impact of landing.

PRIOR ART LIST

Patent Literature

[Patent Literature 1] WO2016/179827

SUMMARY OF THE INVENTION

Technical Problem

However, the Aircraft of Patent Literature 1 uses a method of directly attaching the landing leg support members to an arm or frame of the airframe (hereinafter collectively referred to as the "holding part"), and it is preferable to have fewer components from the viewpoint of improving the efficiency of the airframe configuration of the aircraft. It is desirable to be able to provide parts having a predetermined function or parts supporting parts (hereinafter referred to as "functional parts") without significantly changing the conventional airframe configuration.

In addition, since the propeller of the Patent Literature 1 is a traction type (pull type), the motor and propeller (hereinafter collectively referred to as the "rotor blade part") are attached to the upper part of the holding part, and the functional part (landing legs) can be attached to the bottom of the holding part. However, when the propeller is a propulsion type (pusher type), the rotor blades are already attached to the lower part of the holding part, and if the functional part is to be attached to the lower part of the holding part, the placement of the propeller is limited by the rotor blades. In particular, in the case of landing legs, it is difficult to create a highly stable arrangement during landing (e.g., near the rotor blades, which are located away from the center of the fuselage). Therefore, especially in the case of landing legs, the configuration should be usable for both traction (pull type) and propelled (pusher type) types of aircraft. The same is true for other functional parts in that their placement is also restricted.

Therefore, one object of the present invention is to provide an aircraft with improved efficiency and flexibility of the airframe configuration when providing functional parts on the airframe, and a power unit with a configuration for improved efficiency and flexibility.

Technical Solution

According to the present invention, it is possible to provide an aircraft comprising: a power unit having a first space open at least one of its upper or lower surface; a propeller having a first through-space and connected to the power unit; and a functional part having a predetermined function and located at least partially within an internal space formed by the first space and the first-through space.

According to the present invention, it is possible to provide a power unit, wherein
the power unit has a first space open at least one of its upper or lower surface, wherein the power unit comprises a functional part providing a predetermined function, wherein the functional part is at least partially located in the first space, and a configuration that does not rotate.

According to the present invention, it is possible to provide a power unit,
wherein the power unit has a first space with at least one of its upper or lower surfaces open.
wherein the power unit has a support part connected to a function-providing part that provides a predetermined function,
wherein the support part is at least partially located in the first space and includes a non-rotating configuration.

Advantageous Effects

According to the present invention, an aircraft that improves the efficiency and flexibility of the aircraft configuration, and a power unit with a configuration for improving the efficiency and flexibility can be provided.

DETAILED DESCRIPTION OF THE EMBODIMENTS

Figure 1:
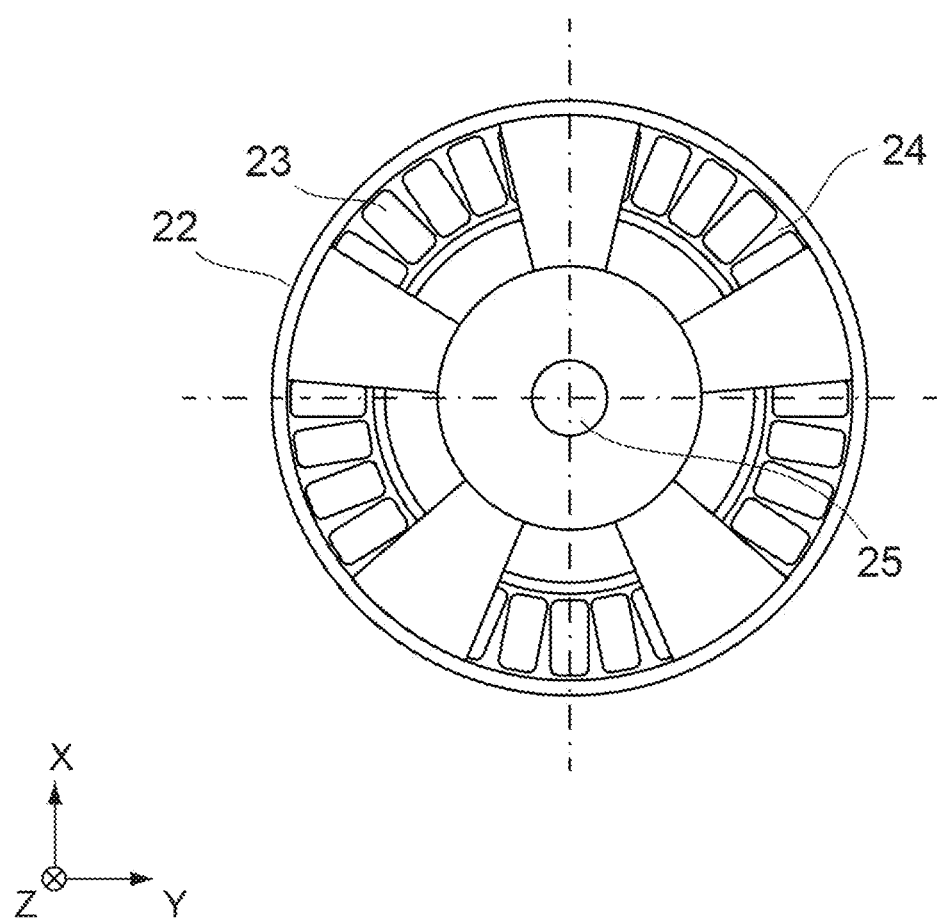
FIG. 1 shows a top conceptual view of a power unit of an embodiment of tins invention.

The following is a list and description of the contents of the embodiments of the present invention. The aircraft according to the embodiment of the invention consists of the following:

[Item 1]
An aircraft, comprising: a power unit having a first space open at least one of a upper surface or a lower surface;
a propeller having a first through-space and connected to the power unit; and
a functional part having a predetermined function and located at least in part within the internal space formed by the first space and the first through-space.

[Item 2]
The aircraft according to Item 1.
wherein the functional part includes a non-rotating configuration.

[Item 3]
The aircraft of Item 1 or Item 2,
wherein a portion of the functional part protrudes from the first through-space of the propeller.

[Item 4]
The aircraft of any one of Items 1 or 3,
wherein the first space is a second through-space through the power unit.

[Item 5]
The aircraft of any one of Items 1 to 4,
wherein the functional part includes a grounding part that is in contact with the ground when landed.

[Item 6]
The aircraft of any one of Items 1 to 5,
wherein a portion of the functional part protrudes from the other side of the power unit, which is different from the one side of the power unit in contact with the propeller.

[Item 7]
The aircraft of any one of Items 1 to 6,
wherein the functional part comprises:
a support part at least partially located in the internal space; and
a function-providing part connected to the support part and providing the predetermined function.

[Item 8]
The aircraft according to Item 7,
wherein the aircraft includes a grounding part that is in contact with the ground at the time of landing as the function-providing part.

[Item 9]
The aircraft of Item 7 or Item 8,
wherein the aircraft includes a propeller guard as the function-providing part.

[Item 10]
The aircraft of any one of Item 7 to Item 9.
wherein the function-providing part includes a jetting means.

[Item 11]
A power unit, wherein the power unit has a first space open at least one of a upper surface or a lower surface,
wherein the power unit is provided with a function part providing a predetermined function, and
wherein the functional unit is at least partially located in the first space and includes a non-rotating configuration.

[Item 12]
A power unit, wherein the power unit has a first space open at least one of a upper surface or a lower surface,
wherein the power unit has a support pan connected to a function-providing part that provides a predetermined function, and
wherein the support part is at least partially located in the first space and includes a non-rotating configuration.

[Item 13]
The power unit of Item 11 or Item 12,
wherein the first space is a through-space through the power unit.

Details of Embodiments According to this Invention

An aircraft according to the embodiments of the present invention will be described below with reference to the drawings. In the accompanying drawings, identical or similar elements are given identical or similar reference codes and names, and duplicate descriptions of identical or similar elements may be omitted in the description of each embodiment. The features shown in each embodiment are also applicable to other embodiments as long as they do not contradict each other.

Figure 2:
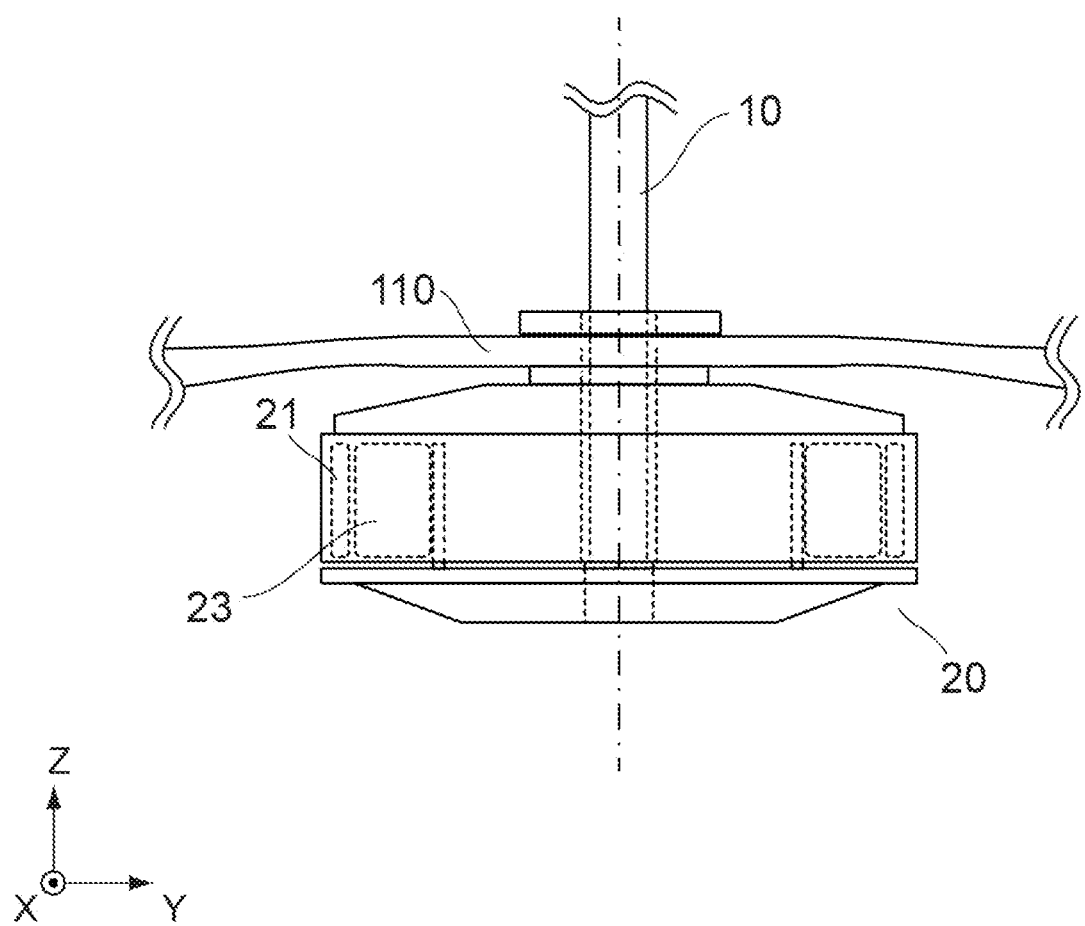
FIG. 2 is a conceptual view of the power unit of FIG. 1 from the side with the propeller connected.

FIGS. 1 and 2 illustrate an outer rotor type motor as a power unit 20 provided by an aircraft according to an embodiment of the invention. The power unit 20 has, for example, a rotor 22 with a permanent magnet 21 and a stator 24 with a winding 23. The propeller 110 is connected to the power unit 20 and rotates in response to the rotation of the power unit 20 to generate lift from a lift-generating surface of the propeller 110.

The configuration of the power unit 20 is not limited to this, as long as it has an inner space and a functional part 10 described below. For example, in the case of an inner rotor type motor, the configuration may be a motor having a pipe-like hollow structure and a hollow shaft, with the through space in the hollow shaft used as a first space described below.

Figure 3:
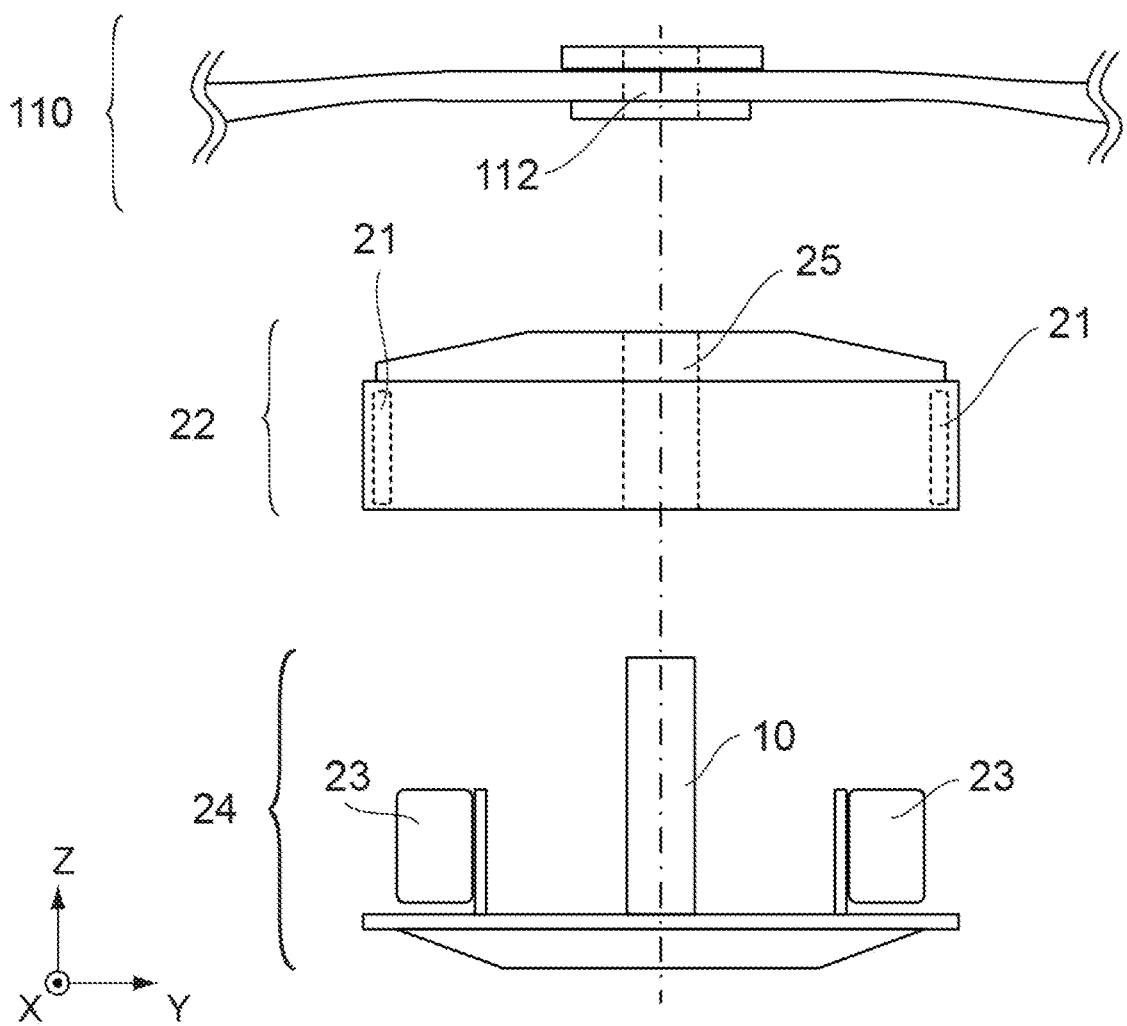
FIG. 3 shows a conceptual view of the power unit of FIG. 2, disassembled and viewed from the side.

The power unit 20 has a space 25 (hereinafter referred to as the "first space 25") located in the center of the top view, for example, as illustrated in FIG. 1 and FIG. 3, etc. This first space 25 is open at least one of the upper or lower surface of the power unit 20, allowing the functional part 10 to protrude from the power unit 20. For example, in FIG. 3, only the upper surface of the power unit 20 is open, and in FIG. 4, the upper and lower surfaces of the power unit 20 are open. In FIG. 1, the opening of the first space 25 is located in the center of the top view, but it is not limited to the center of the top view, and may be located at any location as long as the functional pan 10 does not interfere with the operation of the propeller 110. The propeller 110 also has a first through-space 112. The space in which the first space 25 of the power unit 20 and the first through-space 112 of the propeller 110 are connected to each other is referred to as the "internal space". Each of these spaces may be straight, bent, or curved, respectively, and their shape is not particularly limited.

The functional part 10 provided by the aircraft according to the present invention may be configured to protrude from the top view center of the stator 24 and to project the rotor 22 from the power unit 20 through the first space 25, as shown, for example, in FIG. 3. Furthermore, the functional part 10 is also configured to protrude through the propeller 110, so that the functional part 10 itself functions as, for example, a landing leg of the aircraft 100, as shown, for example, in FIG. 4. Also, as shown in FIG. 5, for example, the functional part 10 may comprise a support 11 at least partially located in the internal space and the function-providing part 12 connected to the support 11 and providing a predetermined function (e.g., landing legs).

Figure 6:
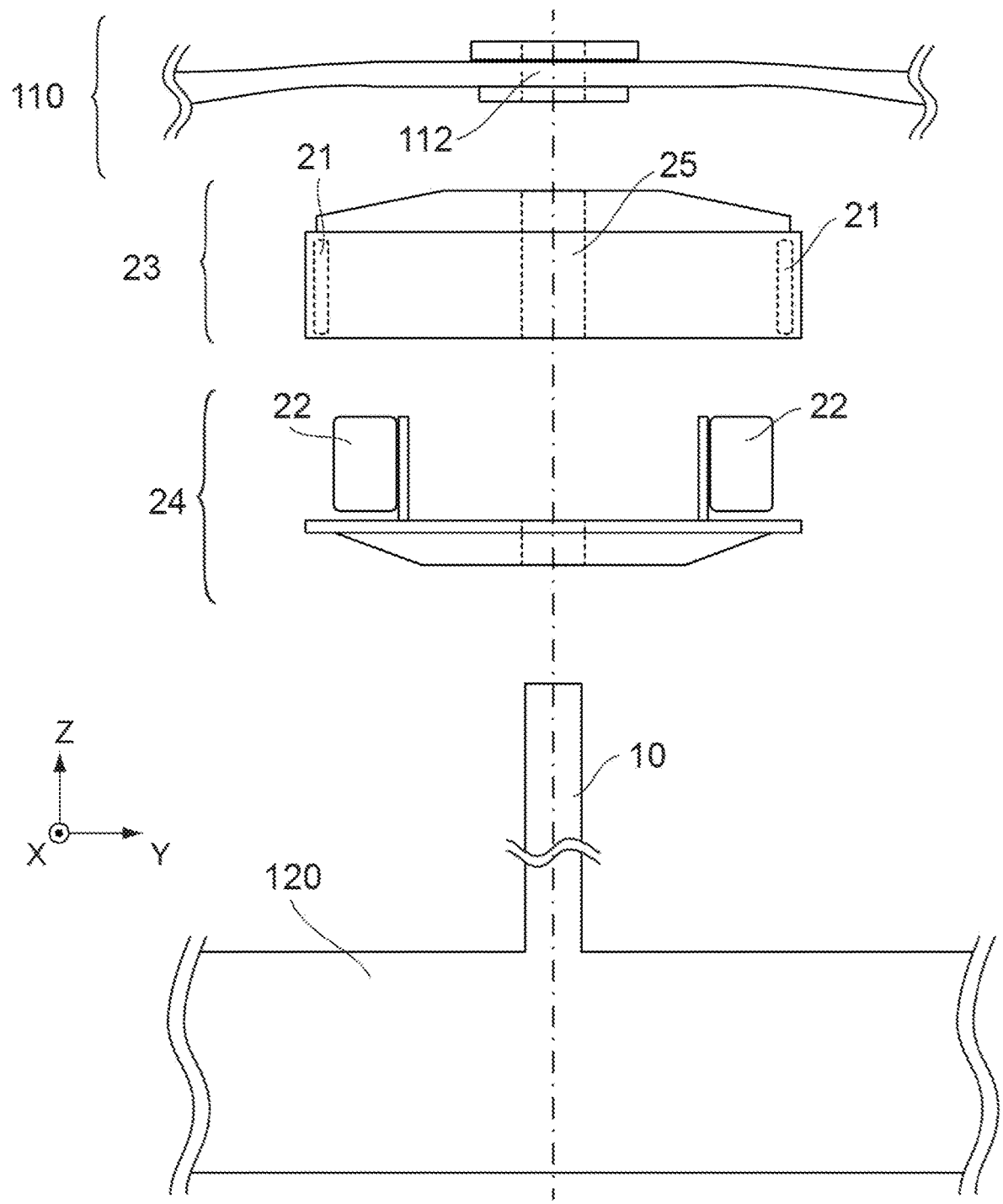
FIG. 6 shows a conceptual view of the power unit in other embodiment of the invention, disassembled and viewed from the side.

FIG. 6 illustrates a modification of the functional part 10 provided by the aircraft of an embodiment of the present invention. The functional part 10 may protrude from a configuration external to the power unit 20, such as the aircraft's holding part 120a and 120b (including, for example, a motor mount (not shown), if the aircraft has one) that holds the power unit 20 and a rotor blade part including the propeller 110. The functional part 10 may also protrude indirectly through a member (not shown) that secures the functional part 10. These functional part 10 can then be configured to protrude from the power unit 20 and the propeller 110 through the first space of the power unit 20 and the first through-space of the propeller 110.

The functional part 10 does not touch the rotor 22 of the power unit 20, and at least the support 11 may be configured not to rotate, or the entire functional part 10 may be configured not to rotate. Alternatively, if the power unit 20 has a through shaft, the functional part 10 may be configured so that the power unit 20 does not touch the through shaft, or may be configured to contact the through shaft using bearings or the like. By doing so, the functional part 10 may be configured not to rotate without being affected by the rotation of the power unit 20. These are only simplified examples, and necessary components may be added as necessary.

Thus, by utilizing the internal spaces of the power unit 20 and the propeller 110, the functional part 10 with a predetermined function can be easily provided without major changes to the conventional configuration of the airframe. In addition, regardless of whether the propeller 110 is a traction type (pull type) or a propulsion type (pusher type), the functional part 10 can be arranged using the spaces above and below the rotor blades, so the arrangement is not limited in any particular way.

The functional part 10 can have a variety of functions. The functional part 10 can be, for example, a landing leg, lights, an antenna, a propeller guard, jetting means (a nozzle), a heat sink, a rectification device, a wheel, an aerodynamic part, and components for supporting the onboard objects.

The function provider 12 may be configured as multiple types of attachments that can be connected to and interchangeable with the support 11 according to requirements and other factors. In the case of interchangeability, the attachment of the support 11 should be standardized so that multiple types of attachments can be easily interchanged. The attachment connection configuration of the attachment part can be easily interchangeable by providing well-known connection methods such as connectors and screws.

Since the functional part 10 can operate independently of the rotation of the power unit 20, a servo or motor installed separately from the power unit 20 can be used to perform the specified rotation or oscillation. This changes, for example, the direction of the nozzle or the angle of the aerodynamic part.

<Configuration of Aircraft 100>

Figure 4:
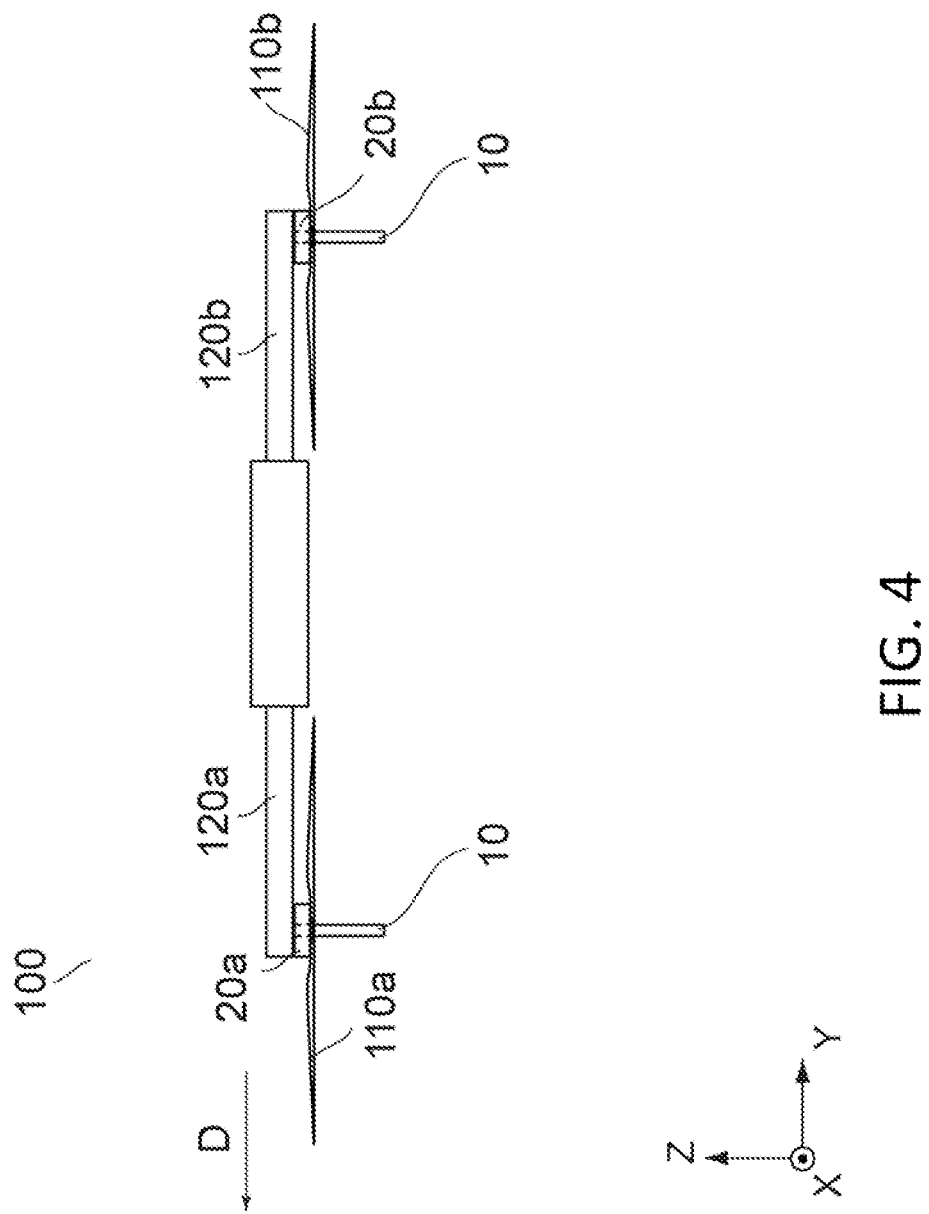
FIG. 4 shows a side view of the aircraft in the first embodiment of the invention.
Figure 5:
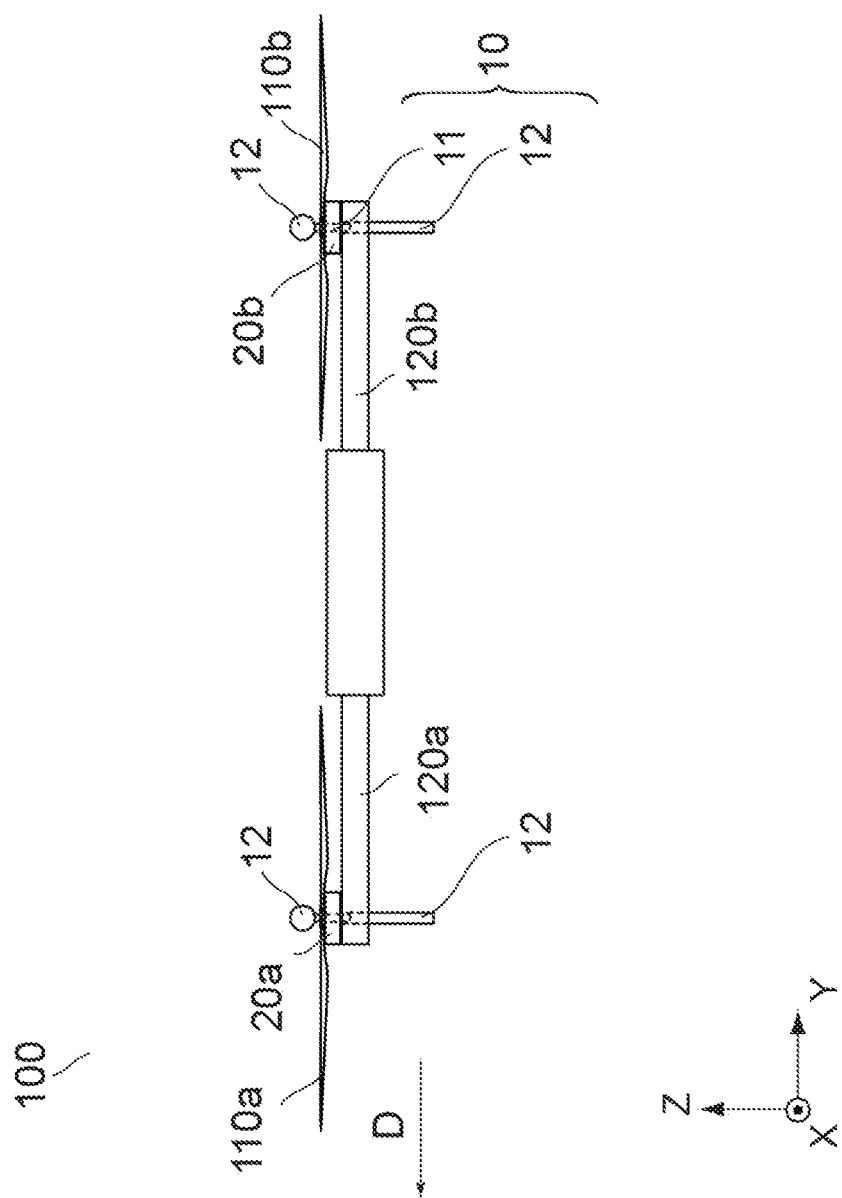
FIG. 5 shows a side view of the aircraft in the second and third embodiments of the invention.

The aircraft 100 illustrated in FIG. 4 and elsewhere should be equipped with at least the propeller 110, power unit 20, and other elements for flight, and energy (e.g., secondary batteries, fuel cells, fossil fuel, etc.) to operate them.

The aircraft 100 shown in the figure is depicted in simplified form to facilitate the explanation of the structure of the invention, and the detailed configuration of the control unit, for example, is not shown.

The aircraft 100 may, for example, travel in the direction of arrow D (−Y direction) in the figure. In the following description, the terms may be used according to the following definitions: Front-back direction: +Y direction and −Y direction, up-down direction (or vertical direction): +Z direction and −Z direction, left-right direction (or horizontal direction): +X and −X directions, forward direction (forward): −Y direction, backward direction (backward): +Y direction, ascending direction (upward): +Z direction, descending direction (downward): −Z direction.

Propellers 110a and 110b rotate under the output from the power unit 20. The rotation of the propellers 110a and 110b generates propulsive force to take the aircraft 100 off from its starting point, move it, and land it at its destination. The propellers 110a and 110b can rotate to the right, stop, and rotate to the left, etc.

The propeller 110 provided by the aircraft 100 of this invention has one or more blades. Any number of blades (rotors)(e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) when the blades are moved through the air. The geometry of the vane can be selected as appropriate to optimize the dynamic aerodynamic characteristics of the vane, such as increasing lift and thrust and reducing drag.

The propeller provided by the aircraft 100 may be, but is not limited to, fixed pitch, variable pitch, or a mixture of fixed and variable pitch.

The power unit 20 produces the rotation of the propeller 110. For example, the drive unit can include an electric motor or an engine. The blades can be driven by the motor and rotate around the motor's axis of rotation (e.g., the long axis of the motor).

The blades can all rotate in the same direction or can rotate independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and control conditions (speed, direction of movement, etc.).

The aircraft 100 determines the number of revolutions of each motor and the angle of flight according to the wind speed and direction by means of a flight controller or a propo, or the like. This allows the aircraft to move up and down, accelerate and decelerate, and change direction.

The aircraft 100 can fly autonomously according to routes and rules set in advance or during the flight, or by using a propo to control the aircraft.

<Functional Block Diagram of Aircraft 100>

Figure 7:
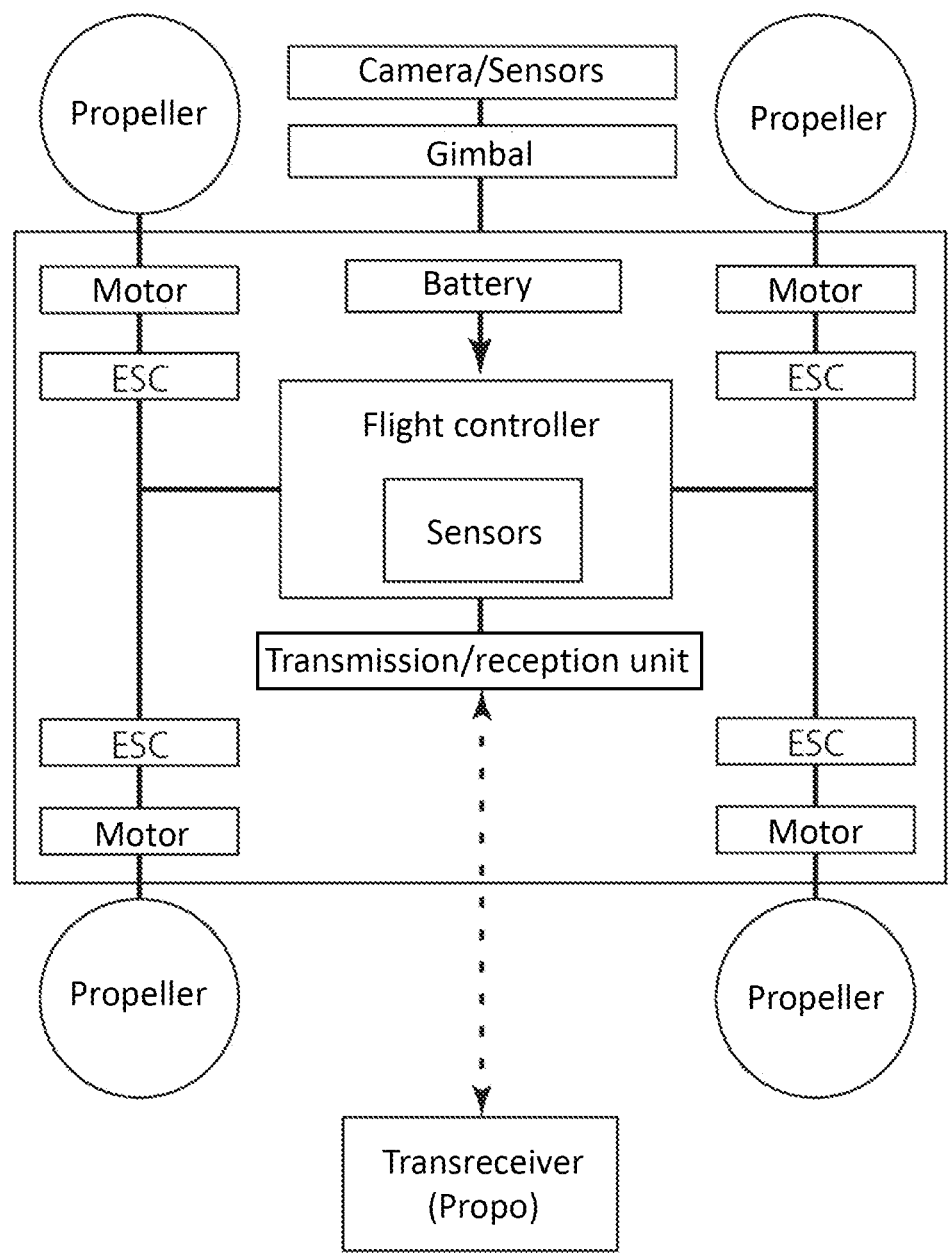
FIG. 7 shows a functional block diagram of an aircraft in an embodiment of the present invention.

FIG. 7 shows a functional block diagram of the aircraft 100, and the functional blocks in FIG. 7 are a minimum reference configuration. A flight controller is a so-called processing unit. A processing unit can have one or more processors, such as a programmable processor (e.g., central processing unit (CPU)). The processing unit has a memory, not shown, which is accessible. The memory stores logic, code, and/or program instructions that can be executed by the processing unit to perform one or more steps. The memory may include, for example, a separable medium such as an SD card, random access memory (RAM), or an external storage device. Data acquired from a camera and sensors may be directly transmitted to and stored in the memory. For example, still and moving image data captured by a camera or other device is recorded in the internal or external memory.

The processing unit includes a control module configured to control the state of the rotorcraft. For example, the control module controls the propulsion mechanism of the rotorcraft (e.g., the 20 power unit) to adjust the spatial placement, velocity, and/or acceleration of the rotorcraft having six degrees of freedom (translational motion x, y, and z, and rotational motion θx, θy, and θz). The control module can control one or more of the states of the mounting part and sensors.

The processing unit is capable of communicating with a transmission/reception unit configured to transmit and/or receive data from one or more external devices (e.g., terminals, display units, or other remote controllers). The transmission/reception unit can use any suitable means of communication, such as wired or wireless communication. For example, the transmission/reception unit can use one or more of the following: local area network (LAN); wide area network (WAN); infrared, wireless; WiFi, point-to-point (P2P) network; telecommunications network; or cloud communications. The transmission/reception unit can transmit and/or receive one or more of the following: data acquired by sensors, processing results generated by the processing unit, predetermined control data, and user commands from a terminal or remote controller.

Sensors in this embodiment can include inertial sensors (accelerometers, gyro sensors), a GPS sensor, a proximity sensor (e.g., lidar), or a vision/image sensor (e.g., a camera).

Details of the First Embodiment

FIG. 4 shows an example of the first configuration of the invention, in which the functional pan 10 functions as a landing leg.

As mentioned above, in an aircraft 100 performing vertical takeoff and landing, when the aircraft 100 contacts the landing surface, the wider the spacing between the landing legs, the more stable it will be. Then, the location of the landing legs where the spacing can be widened without extending the holding part 120, for example, would be near the bottom of the rotor blades. However, the landing legs, especially when the propeller 110 is a propulsion type, need to be installed avoiding the propeller rotating surface so that they do not con into contact with the propeller 110. Therefore, the spacing between landing legs becomes narrower when they are avoided on the center side of the fuselage, and when they are avoided on the outside side of the fuselage, the holding part 120 needs to be extended for landing leg connection. Therefore, with the conventional configuration, it is difficult to achieve both improved landing stability and improved aircraft efficiency, especially when the propeller 110 is a propulsion type.

Therefore, in the first embodiment shown in FIG. 4, the functional part 10 uses the internal space comprising the first space 25 of the power unit 20 and the first through-space 112 of the propeller 110 to allow a landing leg below the power unit 20 even in the aircraft 100 whose propeller 110 is propulsive.

The landing legs may have a ground contact part that makes contact with the ground and may also be equipped with dampers or the like that provide shock mitigation during landing or when placing the aircraft.

This makes it possible to both improve landing stability and aircraft's fuselage efficiency, even when the propeller 110 is a propulsion type.

In the design of aircrafts, the power unit 20 connected to the propeller 110 and the holding pan 120a and 120b are generally mounted robustly in terms of the assumed loads. Therefore, especially when the functional part 10 is a landing leg, it is possible to install the landing leg, which is subject to loads during landing, in the same or close location as the power unit 20, etc., so that the locations to be made robust can be centralized, thus reducing weight increase and center of gravity dispersion.

Details of the Second Embodiment

FIG. 5 illustrates the second embodiment of the invention, in which the function-providing part 12 of the functional part 10 functions as a landing leg.

As illustrated in FIG. 5, for example, in aircraft 100 using a traction-type propeller 110, the landing legs are not restricted in their placement on the propeller 110 when they are provided near the lower portion of the rotor blades and holding pan 120a and 120b, as in the conventional case. However, by using the internal space comprised by the first space 25 of the power unit 20 and the first through-space 112 of the propeller 110, it is possible to provide the landing legs with a simpler configuration. As illustrated in FIG. 5, the functional part 10 may comprise the support 11 protruding from the power unit 20 and the function-providing part 12 connected to the support 11 and providing a function as a landing leg.

Details of the Third Embodiment

FIG. 5 illustrates a third embodiment of the invention in which the function-providing part 12 of the functional part 10 functions as a lighting device (e.g., LED, etc.) or an antenna device.

As illustrated in FIG. 5, it is also possible to provide the functional pan 10 above the rotor blade section, even for the aircraft 100 that uses, for example, a traction-type propeller 110. More specifically, for example, a lighting device or an antenna device can be provided above the rotor blade section as the function-providing part 12. Although the configuration shown in FIG. 5 is for the aircraft 100 that uses a traction-type propeller 110, it can alternatively be provided for the aircraft 100 that uses a propulsion-type propeller 110. The functional pan 10 is not limited to a configuration provided on the connection side of the propeller 110, but can be used m any configuration, such as above or below a propulsion type aircraft, above or below a traction type aircraft, or both above and below a propulsion type and traction type aircraft. This can improve the efficiency of aircrafts by reducing the increase in weight of the airframe by, for example, reducing the number of component parts, and by improving the flexibility of the spatial arrangement.

Details of the Fourth Embodiment

Figure 8:
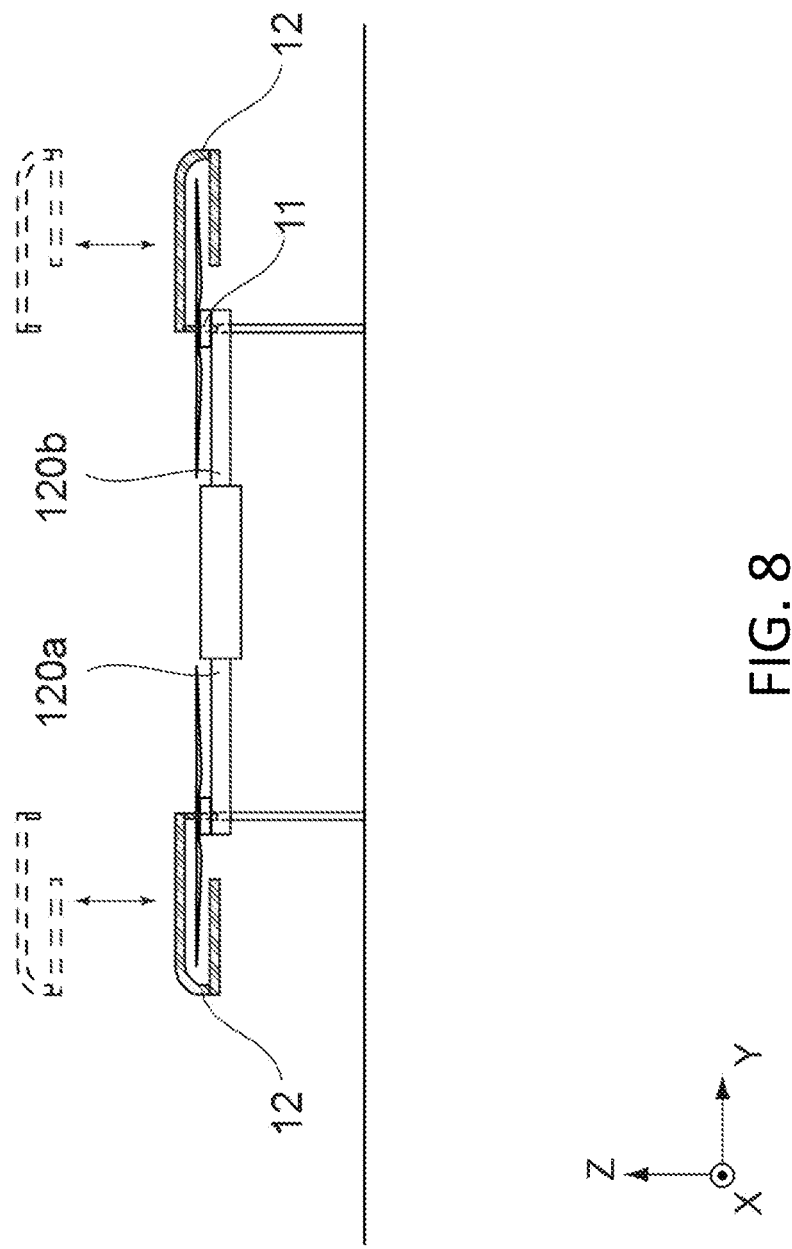
FIG. 8 shows a side view of the aircraft in the fourth embodiment of the present invention.
Figure 9:
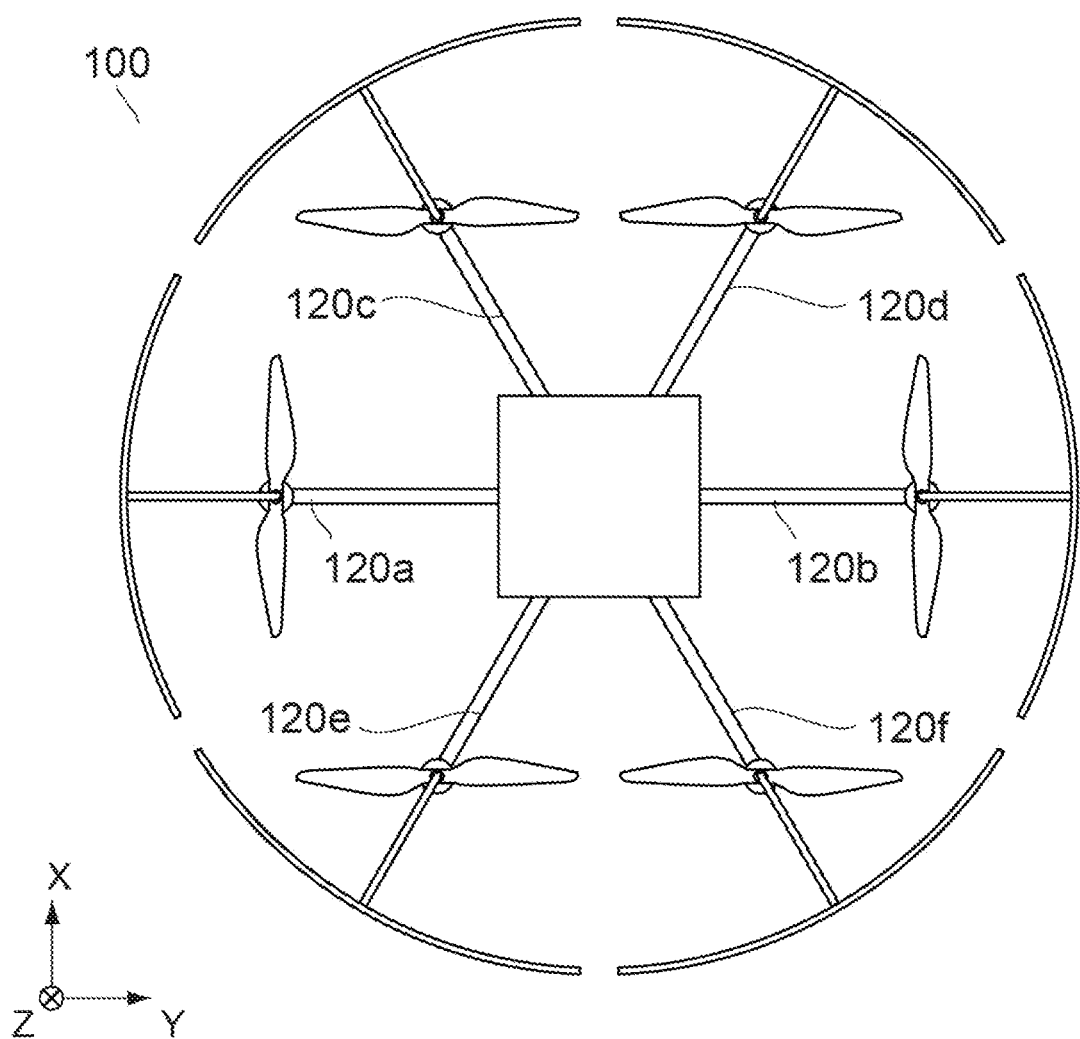
FIG. 9 shows a top view of the aircraft of FIG. 8.

FIGS. 8 and 9 illustrate a fourth embodiment of the invention in which the function part 20, or the function providing-part 23 of the function part 20, functions as a propeller guard.

Figure 10:
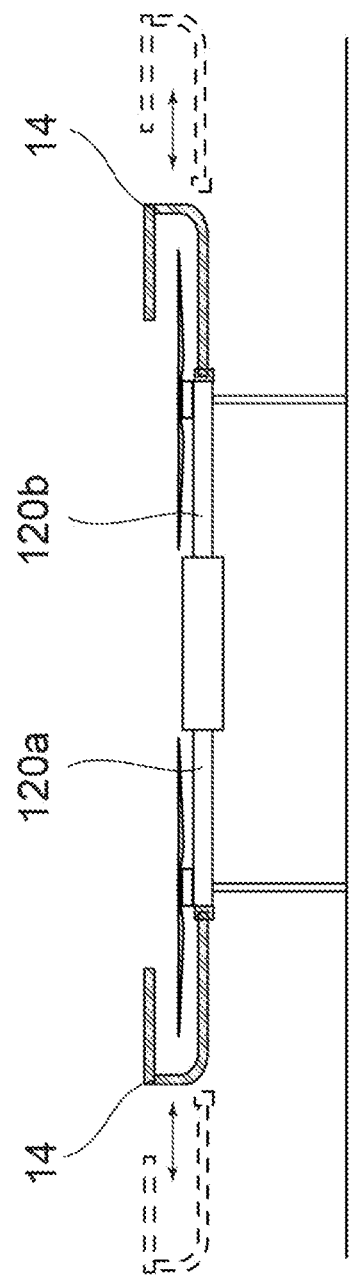
FIG. 10 shows a side view of an aircraft in the existing technology when it is equipped with a propeller guard.
Figure 11:
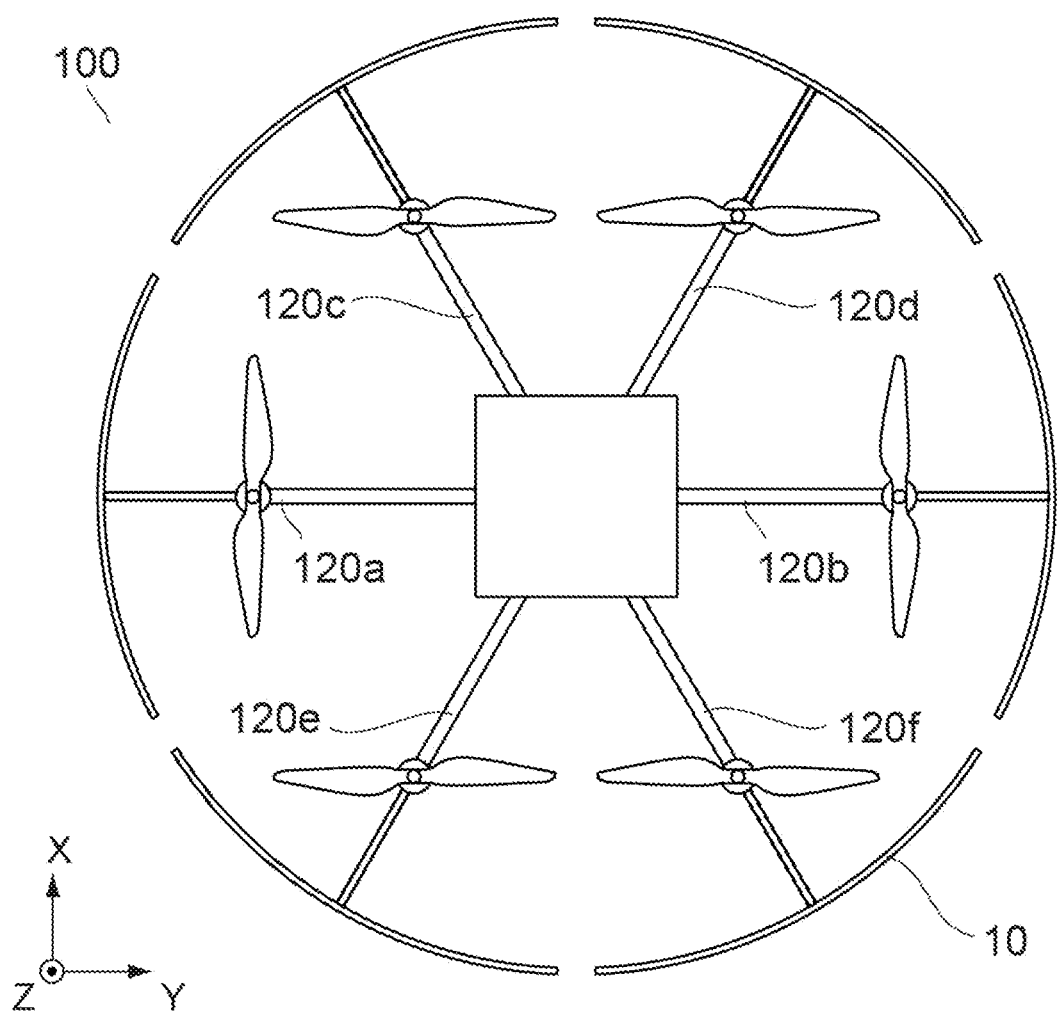
FIG. 11 shows a top view of the aircraft of FIG. 10.

Since the propeller guard can be installed from the top of the aircraft 100, the installation and removal of the propeller guard while the aircraft 100 is on the ground is easier than the installation from the side or from below, as shown in FIGS. 10 and 11.

The configuration shown in FIGS. 8 and 9 is for the aircraft 100 that uses a traction-type propeller 110, but it is also possible to provide the functional part 10 on the aircraft 100 that uses a propulsion-type propeller 110 instead. The functional pan 10 is not limited to a configuration provided on the connection side of the propeller 110, but can be used in any configuration, such as above or below a propulsion-type aircraft, above or below a traction-type aircraft, or both above and below a propulsion-type and traction-type aircraft. This can improve the efficiency of aircrafts by reducing the increase in weight of the airframe by, for example, reducing the number of component parts, and by improving the flexibility of the spatial arrangement.

Details of the Fifth Embodiment

Figure 12:
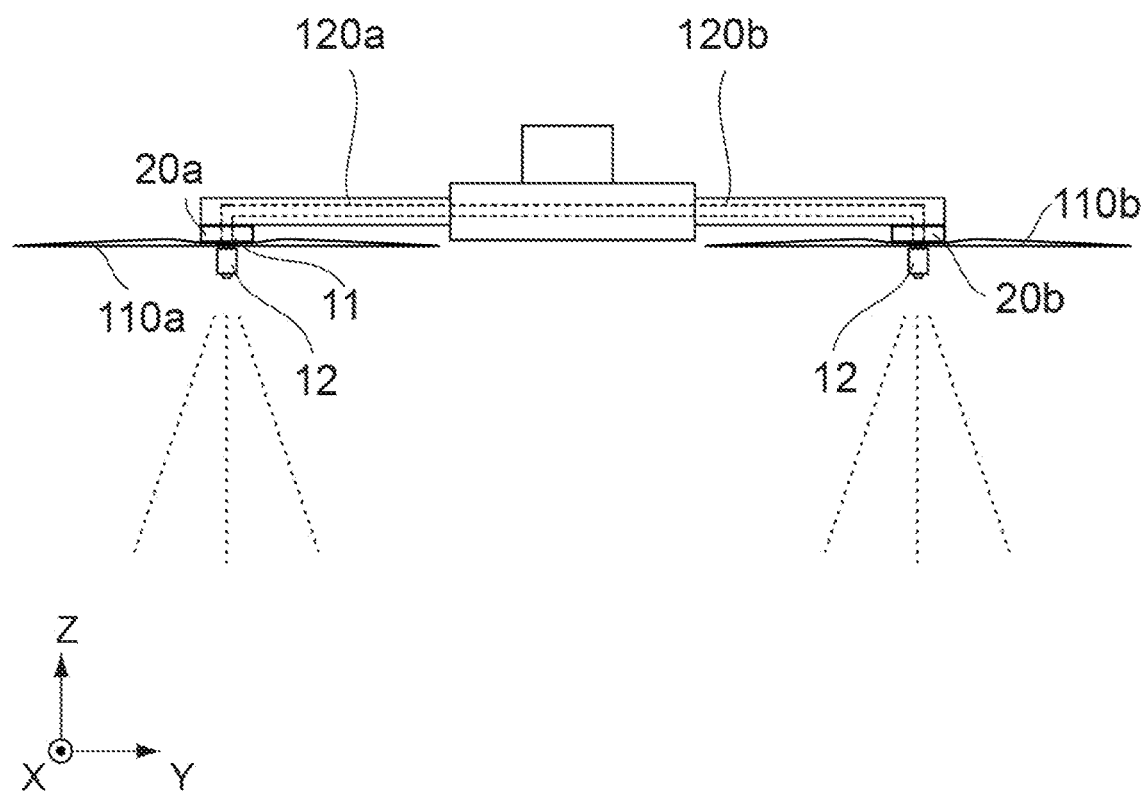
FIG. 12 shows a side view of the aircraft in the fifth embodiment of the invention.

FIG. 12 shows an example of the fifth embodiment of the invention, m which the functional part 10, or the function-providing part 12 of the functional pan 10, serves as the jetting method.

Functional part 10 is a pipe or hose through which a predetermined liquid or powder is passed, and if necessary, as illustrated in FIG. 12, a pipe or the like may be part of the configuration of support part 11, and a jetting means (nozzle) connected to the pipe or the like that sprays, atomizes, or jets the liquid or powder may be used as functional-providing part 12. By setting the function-providing part 12 of the function part 10 on the lower side of the aircraft 100, the propeller 110's wake can be used to strongly apply the liquid or powder to the object or to send it farther away.

Figure 13:
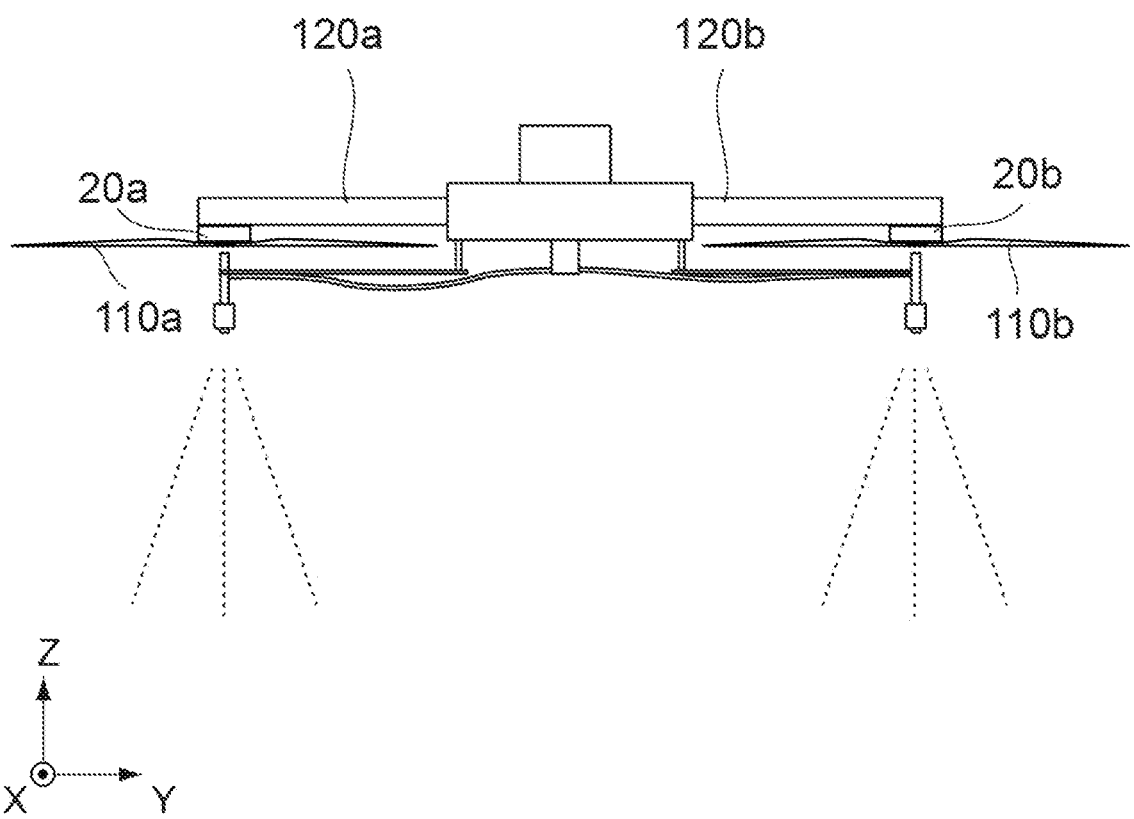
FIG. 13 shows a side view of an aircraft in the existing technology when it is equipped with a nozzle.

In existing multicopter pesticide spraying aircraft, when utilizing the same effect, a pipe or other external device is provided separately from the aircraft's holding part 120a and 120b to pass liquid or powder particles, as shown in FIG. 13. In the functional part 10 according to the present invention, by providing a pipe or the like for passing liquid or powder/pellets inside the holding part 120a and 120b of the aircraft, air resistance during flight can be reduced compared to the flying vehicle 100 that has a separate pipe or the like on the outside.

The configuration shown in FIG. 12 is for the aircraft 100 that uses a traction-type propeller 110, but it can alternatively be provided for the aircraft 100 that uses a propulsion-type propeller 110. However, the configuration is not limited to installing the functional part 10 on the connection side of the propeller 110, but can be used in any configuration, such as installing the functional part 10 above or below the propulsion-type aircraft, above or below the traction-type aircraft, or both above and below the propulsion-type and traction-type aircrafts. This makes it possible to improve the efficiency of the aircraft, such as by reducing the weight increase of the airframe by reducing the number of component parts and by improving the flexibility of the spatial arrangement. Furthermore, if the direction of the jet is the same as the direction of the propeller wake flow, as described above, it is expected to efficiently utilize the propeller wake flow, etc.

Details of the Sixth Embodiment

Figure 14:
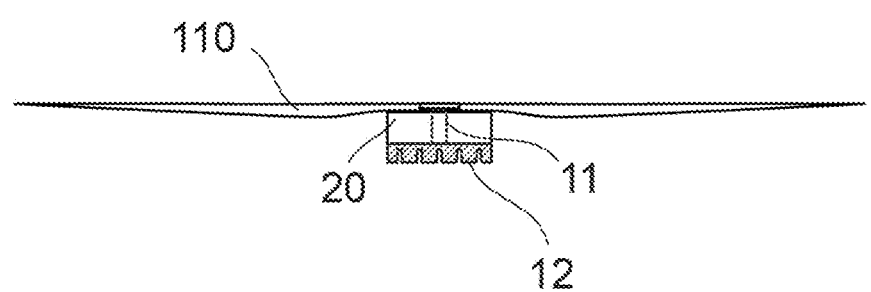
FIG. 14 shows a side view of an aircraft in a sixth embodiment of the invention.

FIG. 14 shows an example of the sixth embodiment of the invention, in which the function part 10, or the function-providing part 12 of the function part 10, functions as a heat sink.

As illustrated in FIG. 14, the function part 10, or the function-providing part 12 of the function part 10, can be provided as a heat sink for the power unit 20 by utilizing the wake motion generated by the rotation of the propeller 110. The use of a material with high thermal conductivity not only draws heat generated inside the power unit 20 to the outside and increases the area exposed to the outside air, but also makes it possible to efficiently cool the power unit 20 because the airflow near the heat sink is difficult to stagnate due to the wake flow of the propeller 110.

In particular, a power unit 20 that is designed to be waterproof and drip-proof is highly sealed to prevent water and dust from entering the unit. In the power unit 20, it is difficult to cool the inside of the power unit 20 because outside air is not drawn into the power unit 20. Therefore, improving cooling performance by enlarging the heat sink is effective.

Examples of heat sink configurations include a pipe shape called a heat pipe, which is used in well-known heat sink mechanisms, and a Sirocco fan shape that takes into consideration not to obstruct the airflow of the propeller wake.

Details of Seventh Embodiment

Figure 15:
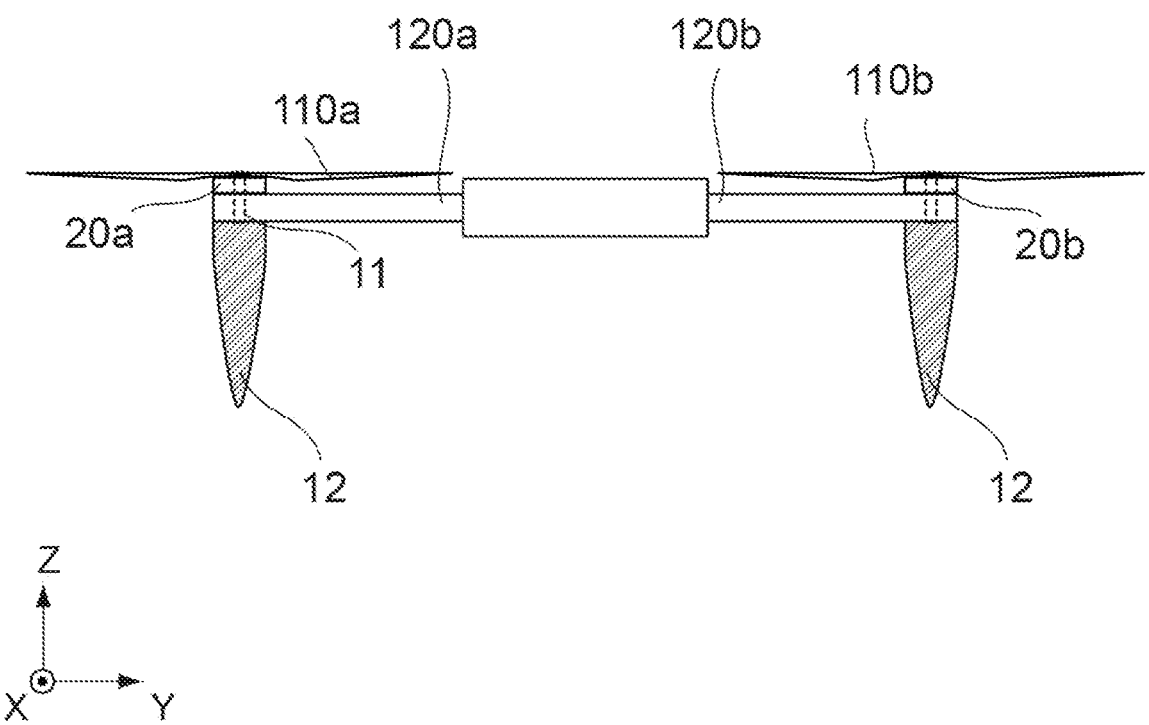
FIG. 15 shows a side view of an aircraft in a seventh embodiment of the invention.
Figure 16:
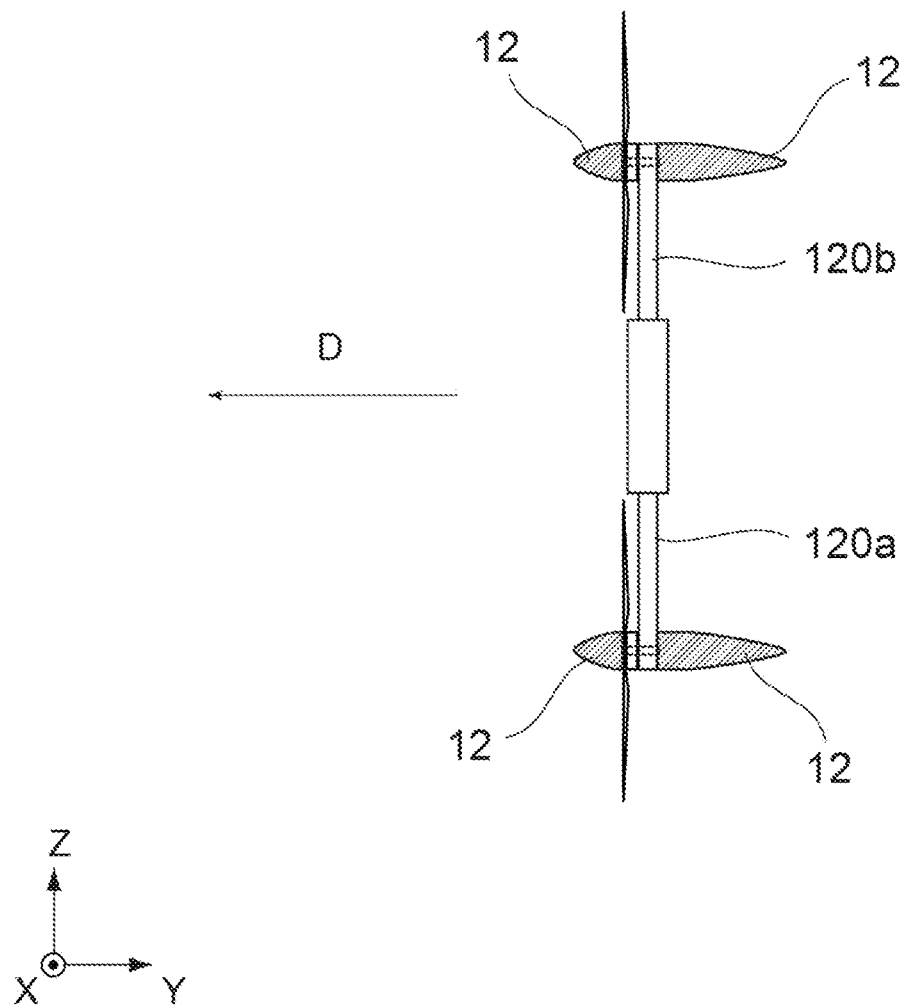
FIG. 16 shows a side view of an aircraft in the seventh embodiment of the invention.

FIGS. 15 and 16 illustrate the seventh embodiment of the invention, in which the function part 10, or the function-providing part 12 of the function part 10, functions as a rectifier.

When the propeller 110 provided by the aircraft 100 rotates, a wake is generated. As illustrated in FIG. 15, the function part 10, or the function-providing part 12 of the function part 10, is provided as an airflow rectifier on the side where the wake is generated, thereby preventing the generation of vortices in the wake that lead to reduced flight efficiency and enabling improved flight efficiency.

As shown in FIG. 16, if the aircraft 100 was a VTOL aircraft, the power unit 20 would be used in the forward and backward directions during horizontal flight, etc., except during vertical takeoff and landing and hovering. In this case, the aircraft 100's flight efficiency is improved by providing the functional part 10 or the functional-providing part 12 of the functional part 10 as an airflow rectifier on the propeller connection side and the opposite side of the propeller connection side of the power unit 20, which are in front of and behind the power unit 20.

If the functional part 10, or the function-providing part 12 of the functional part 10, has multiple functions, for example, a rectifying shape may be provided below the fuselage using a metallic material that acts as a heat sink. In this case, the function part 10, or the function-providing part 12 of the function part 10, can serve as a heat sink, a rectifier, and landing legs. By consolidating the functions in this manner, it is possible to prevent an increase in aerodynamic drag and weight.

The above-described embodiments are merely examples to facilitate understanding of the invention and are not intended to be construed as limiting the invention. It goes without saying that the invention may be changed and improved without departing from its purpose, and that the invention includes its equivalents.

DESCRIPTION OF REFERENCE NUMERALS

10 Functional part
11 Supporting part
12 Function-providing part
20 Power unit

25 First space
100 Aircraft
110 Propeller
112 First through-space
120 Holding part

The invention claimed is:

1. An aircraft, comprising:
a power unit having a first space open at least on one of an upper surface or a lower surface of the power unit;
a propeller having a first through-space and connected to the power unit;
a pair of holding parts defined by an arm or a frame of the aircraft and holding the power unit and the propeller on one side of the pair of holding parts; and
a functional part having a predetermined function and including a grounding part that is configured to be in contact with a ground when landed,
wherein
the grounding part is coaxially arranged with the power unit and is located at least in part within an internal space formed by the first space and the first through-space, and
the grounding part has an end protruding from the first space of the power unit and mounted to the one side of the pair of holding parts.

2. The aircraft according to claim 1,
wherein the functional part has a non-rotating configuration.

3. The aircraft according to claim 1, wherein a portion of the functional part protrudes from the first through-space of the propeller.

4. The aircraft according to claim 1,
wherein the first space is a second through-space through the power unit.

5. The aircraft according to claim 1,
wherein the functional part comprises:
a support part at least partially located in the internal space; and
a function-providing part connected to the support part and providing the predetermined function.

6. The aircraft according to claim 5,
wherein the aircraft includes a propeller guard as the function-providing part.

7. The aircraft according to claim 2, wherein a portion of the functional part protrudes from the first through-space of the propeller.

8. The aircraft according to claim 2,
wherein the first space is a second through-space through the power unit.

9. The aircraft according to claim 3,
wherein the first space is a second through-space through the power unit.

10. The aircraft according to claim 7,
wherein the first space is a second through-space through the power unit.

11. The aircraft according to claim 3, wherein
the portion of the functional part is mounted to the pair of holding parts.

12. The aircraft according to claim 11, wherein the propeller is mounted to a lower the one side of the holding part via the functional part.

13. The aircraft according to claim 1, wherein the grounding part is cylindrical with a center axis.

14. The aircraft according to claim 13, wherein the power unit is rotatable about the center axis of the grounding part.

15. The aircraft according to claim 1, further comprising a further power unit and a further propeller, wherein
the pair of holding parts further holds the further power unit and the further propeller on the one side of the pair of holding parts.

16. The aircraft according to claim 15, wherein the one side of the pair of holding parts is a lower side of the pair of holding parts and is configured to face the ground when landed.

* * * * *